M. RUCKES.
ELEVATING TRUCK.
APPLICATION FILED JUNE 16, 1915.

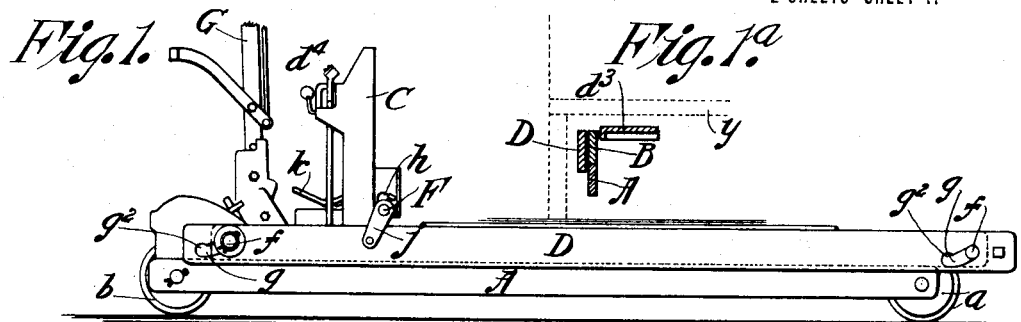
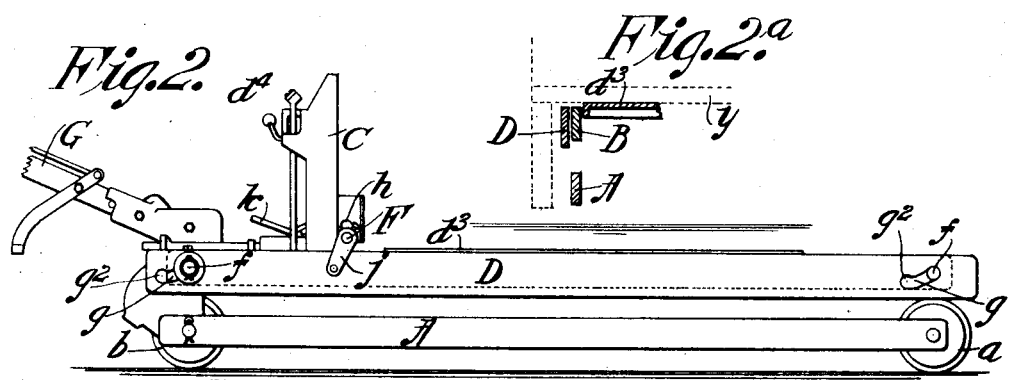
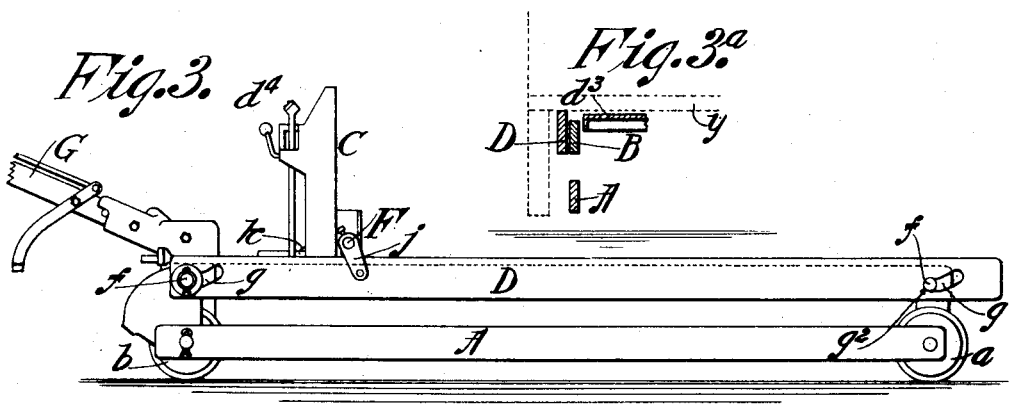

1,165,714.

Patented Dec. 28, 1915.
2 SHEETS—SHEET 2.

WITNESS
B. A. Seaver.

INVENTOR
Michael Ruckes,
BY
ATTORNEY.

UNITED STATES PATENT OFFICE.

MICHAEL RUCKES, OF CHICOPEE, MASSACHUSETTS, ASSIGNOR TO NATIONAL SCALE COMPANY, OF CHICOPEE, MASSACHUSETTS.

ELEVATING-TRUCK.

1,165,714.  Specification of Letters Patent.  Patented Dec. 28, 1915.

Application filed June 16, 1915. Serial No. 34,377.

*To all whom it may concern:*

Be it known that I, MICHAEL RUCKES, a citizen of the United States of America, and resident of Chicopee, in the county of Hampden and State of Massachusetts, have invented certain new and useful Improvements in Elevating-Trucks, of which the following is a full, clear, and exact description.

This invention, for improvements in elevating and weighing trucks, relates to improvements whereby when the truck has received its load, weighed or to be weighed by the scale system or mechanism with which the truck is equipped, and the elevatable portion of the truck is raised, as for the purpose of lifting the load, and therewith the skid or table-like support on which the load had primarily been sustained, for transportation, the load will be sustained by supports appurtenant and supplemental to the elevatable portion of the truck above the level of the platform of the scale, so that in the travel of the truck the load will be free and independent of the scale, and have no tendency to cause joggling of the scale and injury thereto.

The invention is described in conjunction with the accompanying drawings and is set forth in the claims.

Figure 4:
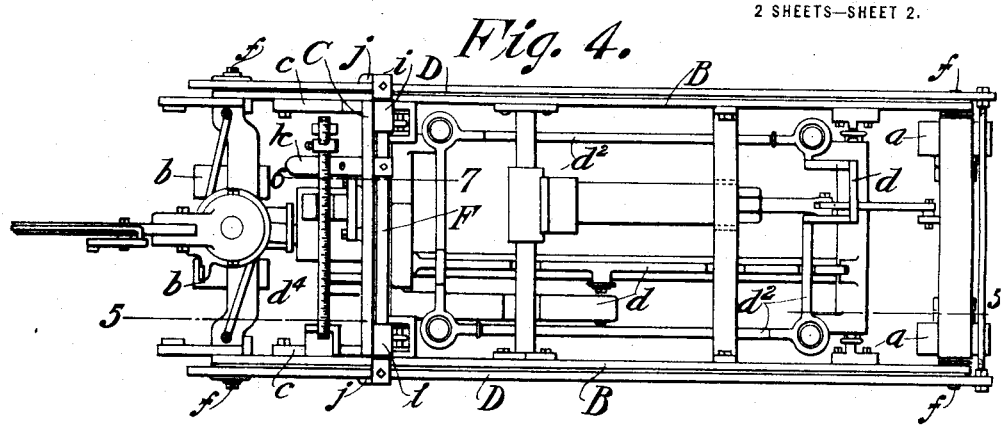
Figure 5:
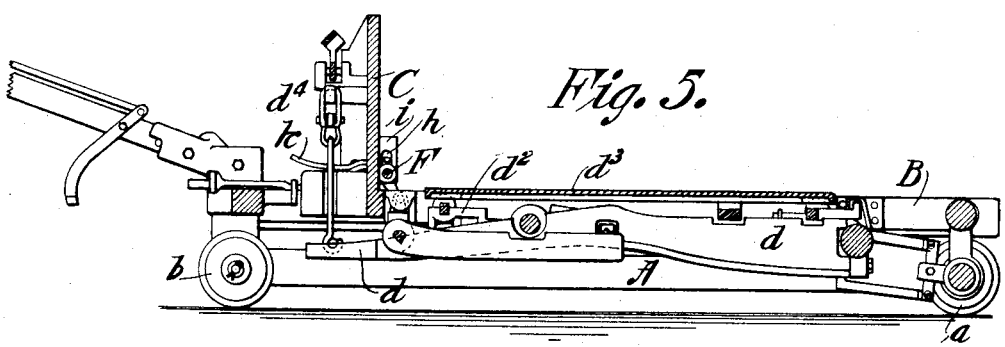
Figure 6:
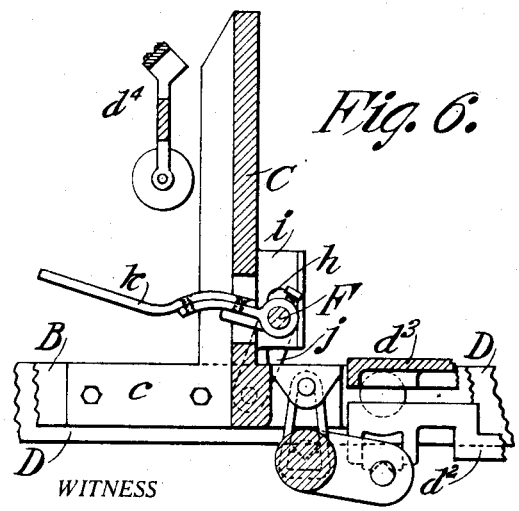
Figure 7:
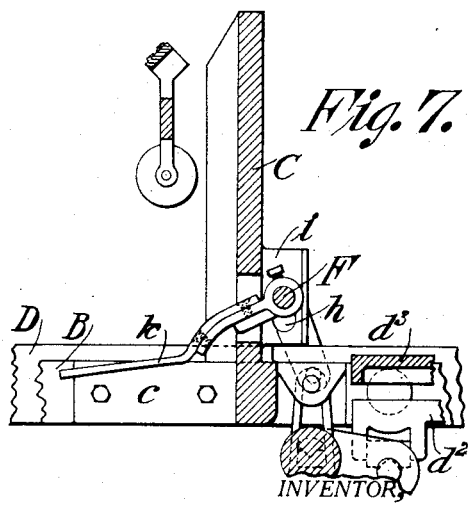

In the drawings: Figures 1, 2 and 3 are side elevations of the improved truck, showing, firstly the truck lowered, secondly the truck raised but having the side portions thereof lower than the scale platform, and thirdly, the truck raised and having the supplemental supports by which the load is carried, raised above the platform of the scale. Figs. 1ª, 2ª and 3ª are diagrammatic views showing the cross sectional aspects of the portions of the truck when in the positions corresponding to Figs. 1, 2 and 3 respectively. Fig. 4 is a plan view of the truck, the platform of the weighing scale being understood as removed. Fig. 5 is a longitudinal vertical section on line 5—5, Fig. 4. Figs. 6 and 7 are partial sectional elevations as seen beyond the plane indicated by line 6—7 Fig. 4, for showing the different positions of the rockshaft and its operating lever hereinafter referred to.

The elevating truck shown in the present drawings is of a construction substantially corresponding to that shown and described in an application for Letters Patent of the United States filed by me December 14, 1914, Serial No. 877,062.

In the drawings, A represents the lower or main truck frame provided with rear and front pairs of rollers $a\ a$ and $b\ b$ and having thereon the elevating frame comprising the opposite longitudinally ranging side bars B B.

Inasmuch as the nature and use of an elevating truck are well known, it is not deemed desirable or necessary to herein describe the detail construction of the present elevating truck and especially inasmuch as this invention is not limited to any particular construction of truck. It will be mentioned, however, that the front rollers $b\ b$ of the truck are mounted on an axle sustained in a head or frame which may both swivel on a vertical axis for steering and oscillate on a horizontal axis,—see Figs. 2 and 3 as compared with Fig. 1, for effecting, through interlocking mechanism between the oscillatory head and the elevating frame, the raising and lowering of the latter. The opposite side bars B B of the elevating frame are transversely united at their forward portions by an upright or standard C,—$c\ c$ representing attaching angle members therefor.

The elevating frame in which the opposite parallel longitudinal side bars B B are comprised carries a weighing scale, the lever system of which is in a general way represented by $d$ in the drawings, such lever system having a frame $d^2$ imposed thereon and on which the platform $d^3$ of the scale rests. The weight determining portion of the scale is link connected to the lever system $d$ and the location thereof is indicated by $d^4$ forward of the upright C. The scale platform $d^3$ as especially shown in all of the Figs. 1ª, 2ª, 3ª, is slightly above the upper edges of the side bars B B of the elevating frame.

D D represent a pair of side bars arranged alongside of and adjacent the side bars B B of the elevating, scale-carrying frame; and the adjacent side bars B and D at each side of the truck have, at different portions in the length thereof, the one a pair of transverse studs $f$ and the other slots $g$ inclined to the length of the bar in and through which the studs engage.

As here shown, the studs $f$ are provided as outward transverse projections of the elevating frame bars B, and the slots $g$ are formed in the bars D. The inclined slots have portions (here represented as the forward end portion of each),—a short extension $g^2$ which is along the horizontal longitudinal line of the bar.

F represents a rockshaft transversely mounted in a bearing slot $h$ therefor in brackets $i$ extending rearwardly from the lower portion of the upright C. This rockshaft has at the opposite ends thereof rigidly fixed lever arms $j\ j$ which are pivoted at their outer ends to the bars D D. The rockshaft has a forwardly extending lever arm $k$ rigidly connected thereto and by means of which the rockshaft is oscillated.

When the side bars D D are in their lowered position, as shown in Fig. 1, with the right hand and higher portions of the slots $g$ next to the studs $f$ and the lever $k$ is depressed to rock the shaft and swing the paired levers $j$ to the rightward, correspondingly endwise moving the bars D, said bars will by the impingement of the slot walls against the studs cause the elevation of the bars from the position relatively to the truck frame bars B shown in Figs. 1 and 1$^a$ to the positions shown in Figs. 3, and 3$^a$,—reference in this connection being also had to Figs. 6 and 7 and also to the relative positions of the upper edges of the side bars D D and the platform $d^3$ of the weighing scale. The outside bars D D being shifted to the rightward and elevated have such positions that the left hand, substantially horizontal or longitudinal end portions $g^2$ of the slots are next to the studs, and by reason of the stated formation of such end extensions the bars are locked in their elevated position, and the tendency of the weight or load which may be sustained by such bars will be without effect to cause relative movement between the slot walls and studs, or permit of any movement of the actuating rockshaft excepting as such is purposely performed.

By dotted lines in Figs. 1$^a$, 2$^a$, and 3$^a$, the skid $y$ for the load is shown. In Fig. 1$^a$ the skid is represented in relation to the truck in its lowered condition, the feet of the skid resting on the floor while its horizontal load supporting portion is above and free from the truck and its platform. In Fig. 2$^a$ the truck is represented as elevated, the side bars D being in the lower relation to the side bars B of the elevating frame; the scale platform is shown above the elevating frame, and the skid with its load is represented as lifted free from the floor and resting on the scale platform and thus capable of being weighed. In Fig. 3$^a$ the side bars D of the elevating portion of the truck are represented as thrown upwardly to a level above that of the scale platform so that the load is carried by such bars and the scale platform is relieved of the weight.

One of several manners of use of the truck is,—with the parts in the relation shown in Figs. 1 and 1$^a$, to run the truck under the skid supported load, then to cause the elevation to take the load aboard to rest on the scale platform, as indicated by Fig. 2$^a$, and to then weigh the load and note the weight thereof; and then to let the elevating portion of the truck down to the position of Fig. 1$^a$; to next elevate the outside bars D D above the edges of the bars B B, and then through the powerful means actuated through the medium of the lever-like draft handle G and oscillatory head or frame with which the handle, axle and front rollers are connected, effect the raising of the elevating portion of the truck, and as one with it the upwardly positioned side bars D D, to take the weight so that in the transportation there will be no cause for joggling of the platform and other parts of the scale with consequent liability of injury thereto.

Various changes in respect to minor details of construction in the novel part of the present devices may be made without departure from this invention.

I claim:—

1. A truck comprising a main frame, and a frame elevatable and depressible relatively thereto, a weighing scale carried by the elevatable frame, and comprising a platform higher than such frame, members carried by the elevatable scale carrying frame, movable from a position below to a position above the scale platform, and position-shifting means for said members.

2. A truck comprising a main frame, and a frame elevatable and depressible relatively thereto, a weighing scale carried by the elevatable frame, and comprising a platform higher than such frame, members carried by the elevatable scale carrying frame, movable from a position below to a position above the scale platform, and means for shifting the said members from their lowered to their raised position and for locking them in the latter position.

3. A truck comprising a main frame, and a frame elevatable and depressible relatively thereto, a weighing scale carried by the elevatable frame, and comprising a platform higher than such frame, a pair of side bars arranged along and adjacent the outer sides of the elevatable scale carrying frame, a rock-shaft supported by the scale carrying frame having means for operating it, and engaging, and operable when the shaft is rocked to impart endwise movements to the side bars, and coöperative means, appurtenant to the elevatable frame and said side bars for causing the raising and lowering of the latter in conjunction with their endwise movements.

4. In an elevating weighing truck, a main frame, and a frame elevatable and depressible relatively thereto, and comprising side bars, a weighing scale carried by the elevatable frame, and comprising a platform higher than the tops of said side bars, a pair of side bars arranged along and adjacent the side bars of the scale carrying frame, each adjacent pair of side bars having, at different portions in the length thereof, the one a pair of transverse studs and the other slots inclined to the length of the bar, in which the studs engage and means for imparting endwise movements to the slot-provided bars.

5. In an elevating weighing truck, a main frame, and a frame elevatable and depressible relatively thereto, and comprising side bars, a weighing scale carried by the elevatable frame, and comprising a platform higher than the tops of said side bars, a pair of side bars arranged along and adjacent the side bars of the scale carrying frame, each adjacent pair of side bars having, at different portions in the length thereof, the one a pair of transverse studs and the other slots inclined to the length of the bar and each having an end portion thereof extended along the longitudinal line of the bar, and means for imparting endwise movements simultaneously to the slot-provided bars.

6. A truck comprising a main frame, and a frame elevatable and depressible relatively thereto, and having an upright at its forward end portion provided with a transverse vertical slot bearing, and a rock-shaft, in said slot bearing provided with a forwardly extended lever, a weighing scale carried by the elevatable frame, and comprising a platform higher than such frame, a pair of side bars arranged along and adjacent the outer sides of the scale carrying frame, each adjacent pair of side bars having at different portions in the length thereof, the one a pair of transverse studs, and the other slots inclined to the length of the bar, and lever arms carried at the opposite ends of the rock-shaft, the outer ends of which are pivoted to the side bars which are outside of the elevatable frame side bars.

Signed by me at Springfield, Mass., in presence of the subscribing witness.

MICHAEL RUCKES.

Witness:
G. R. DRISCOLL.

Copies of this patent may be obtained for five cents each, by addressing the "Commissioner of Patents, Washington, D. C."